United States Patent [19]

Murakawa et al.

[11] Patent Number: 5,039,184
[45] Date of Patent: Aug. 13, 1991

[54] OPTICAL BEAM SCANNER FOR BAR-CODE

[75] Inventors: Yoshitaka Murakawa, Fuchu; Yuichiro Takashima, Yokohama; Shigeru Noda, Kawasaki; Ichiro Sebata, Tokyo; Mitsuharu Ishii, Hachiouji, all of Japan

[73] Assignee: Fujitsu Limited, Kawasaki, Japan

[21] Appl. No.: 371,087

[22] Filed: Jun. 26, 1989

[30] Foreign Application Priority Data

Jun. 24, 1988 [JP] Japan ................................. 63-154961

[51] Int. Cl.⁵ .......................... G02B 26/08; G06K 7/10
[52] U.S. Cl. ..................................... 359/216; 235/467
[58] Field of Search ................. 350/6.7, 6.8, 6.9, 6.91, 350/3.71; 250/235, 236, 566, 568; 235/467

[56] References Cited

U.S. PATENT DOCUMENTS

| | | | |
|---|---|---|---|
| 3,520,586 | 7/1970 | Bousky | 350/6.7 |
| 3,718,761 | 2/1973 | Myer | 350/6.8 |
| 3,818,444 | 6/1974 | Connell | 350/6.8 |
| 4,875,748 | 10/1989 | Matsumoto et al. | 350/6.8 |

FOREIGN PATENT DOCUMENTS 61-084294 4/1986 Japan .
61-118299 6/1986 Japan .

Primary Examiner—Bruce Y. Arnold
Assistant Examiner—James Phan
Attorney, Agent, or Firm—Staas & Halsey

[57] ABSTRACT

An optical beam scanner, for reading a bar-code, which comprises a housing (10) accommodating therein a beam generator (1) for projecting a laser beam (34) along a fixed axis, a rotary mirror (30, 40) rotatable about its axis (32) and having a plurality of reflection surfaces (30a, 30b) arranged in a polygonal manner on the periphery of a body thereof, which surfaces receive and reflect the laser beam (34) projected from the beam generator (1), and a unit for driving the rotary mirror (30) to rotate at a predetermined speed during the operation. The housing is provided with a window (21) on an upper wall thereof, through which passes the laser beam (35) reflected from the respective reflection surfaces (30a, 30b) of the rotary mirror (30) for scanning a bar-code disposed above the window (21), and each of the reflection surfaces (30a, 30b) of the rotary mirror (30) is formed by a part of a circular cylindrical surface cut out along a height thereof in an elongated rectangular shape and disposed so that a ridgeline (33) is transverse to the axis (32) of the rotary mirror (30). A direction of a normal vector to the reflection surface (30a, 30b) is smoothly varied in one direction along a scanning line (X) on the reflection surface (30a, 30b) traced by sequential points of incidence of the laser beam (34) across the reflection surface (30a, 30b) when the rotary mirror (30) is rotated, whereby the reflected beam (35) traces various linear scanning patterns (A, B), each corresponding to the respective reflection surface (30a, 30b), on a plane of the window (21) above which the bar-code is scanned.

2 Claims, 6 Drawing Sheets

OPTICAL BEAM SCANNER FOR BAR-CODE

BACKGROUND OF THE INVENTION

1. Field of the Invention

The present invention relates to an optical beam scanner used for reading a bar-code from omnidirectional light beam patterns in a POS (Point Of Sales) system.

2. Description of the Related Art

The POS system is now widely used in supermarkets and department stores for the sales management of goods and to speed up the checkout operation.

This system comprises a beam scanner for scanning a bar-code printed or attached to goods by a scanning light beam and converting the detected optical information into data suitable for computer-processing, a computer for processing the obtained data, and a POS register for connecting the beam scanner to the computer and displaying the necessary information to a customer.

In this regard, as illustrated in FIG. 9 a "bar-code" is a combination of thin and thick black lines 50, 51 and wide and narrow spaces 52, 53: these being variously arranged to represent a specific character, numeral, or symbol.

The bar-code is scanned by a beam scanner, such as a wand, a laser scanner, or a CCD scanner, which detects the variation of intensity of a light scattered by the bar-code on which the beam is incident; and converts the same to an electric signal.

Among known beam scanners, the laser scanner, which comprises a means for displacing a laser beam across a bar-code printed or attached to goods and moved laterally over a window of the scanner housing by an operator, a means for detecting a beam reflected from the bar-code, including various intensity variations corresponding to black and white areas on the bar-code, and a means for converting an optical signal obtained from the detected light intensity into an electric signal and decoding same as bar-code information, is most widely used.

To raise the efficiency of the checkout operation, an easily operable optical beam scanner must be used. Particularly, the bar-code must be accurately read even though a label carrying the bar-code is variously disposed on the goods, so that it is not necessary for the operator to orient the bar-code label in only one direction during the scanning. This function is known as "omni-directional readability".

To maintain the "omni-directional readability" at a high level even when reading a bar-code based on truncated symbols having bars approximately half the length of standard bars, the laser beam must be scanned along omni-directional scanning patterns; for example, in a horizontal scanning line for reading bar-code symbols oriented approximately in the horizontal direction, in a vertical scanning line for reading symbols oriented approximately in the vertical direction, and in an oblique scanning line for reading symbols oriented approximately in a direction between the horizontal and the vertical.

Further the beam scanner must be compact, to ensure a wider field of application to various checkout systems currently used in the merchandising industry.

To obtain such omni-directional scanning patterns, a beam scanner provided with a rotary mirror is used, as illustrated in FIG. 7. In this scanner, a laser beam 2 projected from a laser tube 1 is deflected by small mirrors 5, 6 and a large mirror 9, and received by a rotary mirror 29 through a flat area 81 of a combination lens 8. In the drawing, reference numeral 10 designates a scanner housing.

The body of the rotary mirror 29 has a conical shape, and two flat reflection surfaces 29a are arranged on the opposite slants of the cone, symmetrical with each other relative to a central axis of the cone, so that the reflection surfaces 29a are directed downward. The beam incident on the reflection surface 29a is deflected to a first mirror 15 disposed therebelow, and reflected thereby to a second mirror 18 associated with the first mirror 15. Note, usually a plurality of pairs of first and second mirrors are provided, but only one pair is illustrated in FIG. 7, to clarify the drawing. The beam reflected by the second mirror 18 emerges from the scanner through a window 21, in an obliquely upward oriented direction. This beam traces, for example, a horizontal scanning pattern e (see FIG. 8) on the window surface.

As the rotary mirror 29 is driven to rotate about its axis by a not shown motor, the beam deflected by the reflection surface 29a is received by another pair of first and second mirrors, and traces another scanning pattern other than the horizontal pattern, and accordingly, omni-directional scanning patterns a through e can be obtained on the window surface. If more scanning patterns are required, the number of pairs of first and second mirrors can be increased accordingly. In FIG. 8, reference numeral 22 designates an imaginary vertical plane.

As shown in FIG. 7, a bar-code carried on a label attached to goods 24 is moved across the window 21 and illuminated by the laser beam tracing one of these omni-directional scanning patterns. Part of the laser beam scattered by the bar-code corresponding to black and white areas thereof is returned to the scanner through the window 21 and reflected reversely along the above-described path. The returned beam is converged by the combination lens 8 and reflected by the large mirror 9 into a detector 28, which detects the pattern of the intensity variation containing the bar-code information. The intensity variation is converted to electric signals by the detector 28 and decoded as bar-code signals through a not shown A/D converter and decoder.

As stated above, the prior art fixed type laser scanner must be provided with a plurality of pairs of mirrors for selectively deflecting a laser beam reflected by a rotary mirror onto a plurality of flat mirrors arranged around a rotary axis thereof. This type of beam scanner, however, is very expensive due to the need for a plurality of mirrors, each of which must be manufactured and adjusted with a high degree of skill and accuracy. In addition, the intensity of the laser beam is dampened to a great extent due to the repeated reflections by the mirrors, which lowers the readability of the beam scanner. Conversely, if a high grade mirror having a better reflective efficiency is used to minimize this dampening of the beam intensity, the manufacturing cost of the beam scanner is further increased. Note, such a beam scanner is disclosed in, for example, Japanese Unexamined Patent Publication (Kokai) No. 62-194586 and U.S. Pat. No. 4,799,164.

SUMMARY OF THE INVENTION

Accordingly, an object of the present invention is to eliminate the above drawbacks of the prior arts and provide a bar-code scanner in which omni-directional scanning patterns of a laser beam are easily obtained by a simple optical system having a small number of mirrors.

Therefore, according to the present invention, there is provided an optical beam scanner, for reading a barcode, which comprises a housing accommodating therein a beam generator for projecting a laser beam along a fixed axis, a rotary mirror rotatable about its axis and having a plurality of reflection surfaces arranged in a polygonal manner on the periphery of a body thereof, which reflection surfaces receive and reflect the laser beam projected from the beam generator, and means for driving the rotary mirror to rotate at a predetermined speed during operation. This housing is provided with a window on an upper wall thereof through which passes the laser beam reflected from the respective reflection surfaces of the rotary mirror, to scan a bar-code disposed above the window.

The scanner according to the present invention is characterized in that each of the reflection surfaces of the rotary mirror has a configuration defined in such a manner that a direction of a normal vector to the reflection surface is smoothly varied in one direction along a scanning line on the reflection surface traced by sequentially incident points of the laser beam across the reflection surface when the rotary mirror is rotated, whereby the reflected beam traces various linear scanning patterns, each corresponding to a respective reflection surface, on a plane of the window above which the bar-code is scanned.

The reflection surfaces may be either concave or convex, but preferably each reflection surface is formed by a part of a circular cylindrical surface cut out along a height thereof in an elongated rectangular shape and disposed so that a ridgeline thereof is transverse to the axis of the rotary mirror.

The beam scanner according to the present invention also may comprise at least one additional flat mirror, positioned after the rotary mirror, for directing the laser beam reflected by the reflection surface in an optional direction.

In the above beam scanner according to the present invention, a laser beam projected from the beam generator along a fixed path is received by one of the reflection surfaces of the rotary mirror and deflected thereby at an angle corresponding to an angle of incidence of the beam, which varies in accordance with the inclination and curvature of a point on which the beam is incident. The incident point is moved laterally across the reflection surface as the rotary mirror is rotated at a predetermined speed, whereby the angle of incidence of the beam is varied accordingly and the direction of the beam reflected by the reflection surface is also gradually varied. As a result, the reflected beam traces a linear scanning pattern on the window plane, and since the inclination and/or curvature of each respective reflection surface is different, the linear scanning pattern depicted on the window plane also has various gradients; whereby the omni-directional scanning patterns can be obtained.

BRIEF DESCRIPTION OF THE DRAWINGS

The other objects and advantages of the present invention will be more apparent from the following description with reference to the drawings illustrating the preferred embodiments of the present invention, wherein.

DESCRIPTION OF THE PREFERRED EMBODIMENTS

Figure 7:
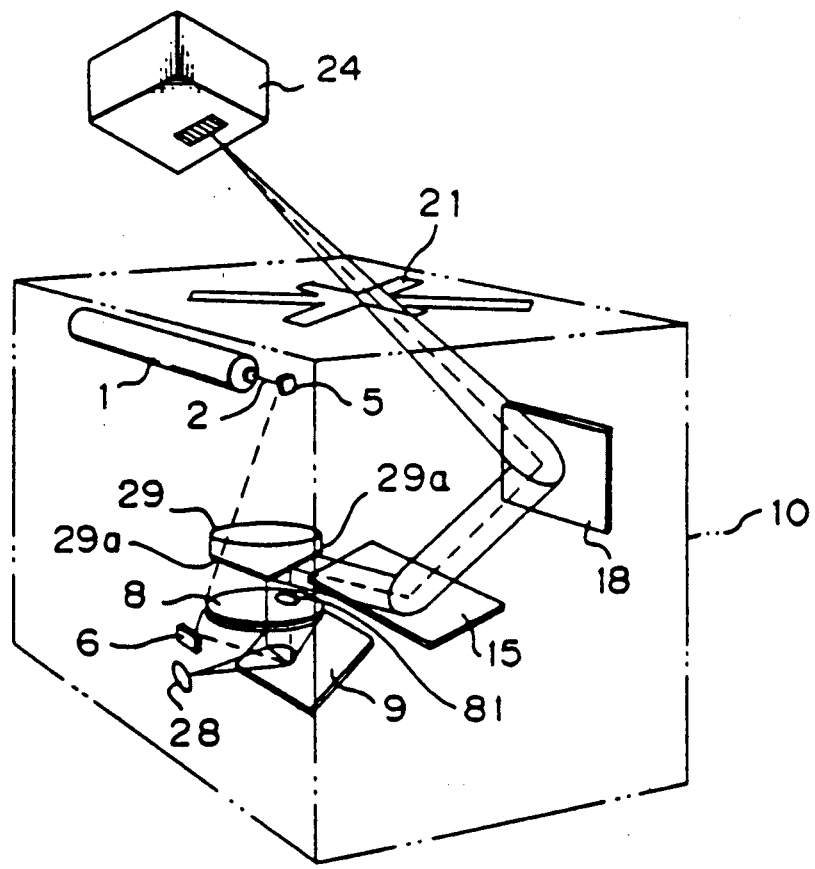
FIG. 7 is a perspective view of a prior art laser beam scanner provided with a conventional rotary mirror having a flat type polygonal reflection surface.
Figure 8:
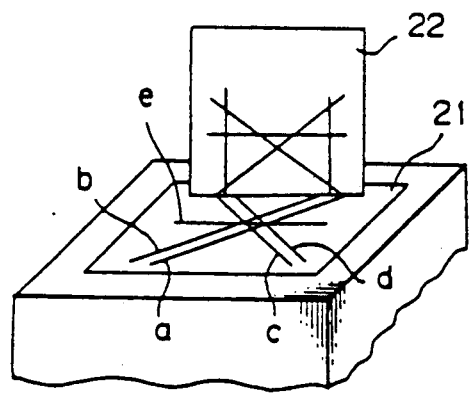
FIG. 8 is a perspective view illustrating omni-directional scanning patterns obtained from the beam scanner of FIG. 7.
Figure 9:
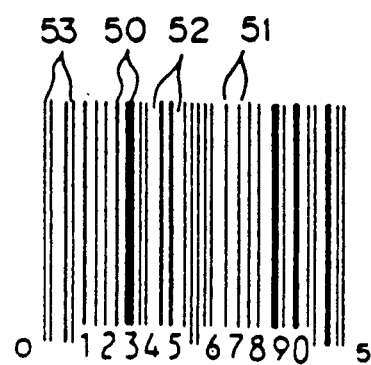
FIG. 9 is a representative illustration of a bar-code.

A beam scanner according to the present invention is based on substantially the same principle as that of the prior art beam scanner illustrated in FIG. 7, except that the first mirror 15 and the second mirror 18 are omitted and a rotary mirror having a novel structure is provided instead of the conventional rotary mirror. Accordingly, to avoid repetition in the explanation, only the unique constitution of the present invention will be described in this specification.

Figure 1:
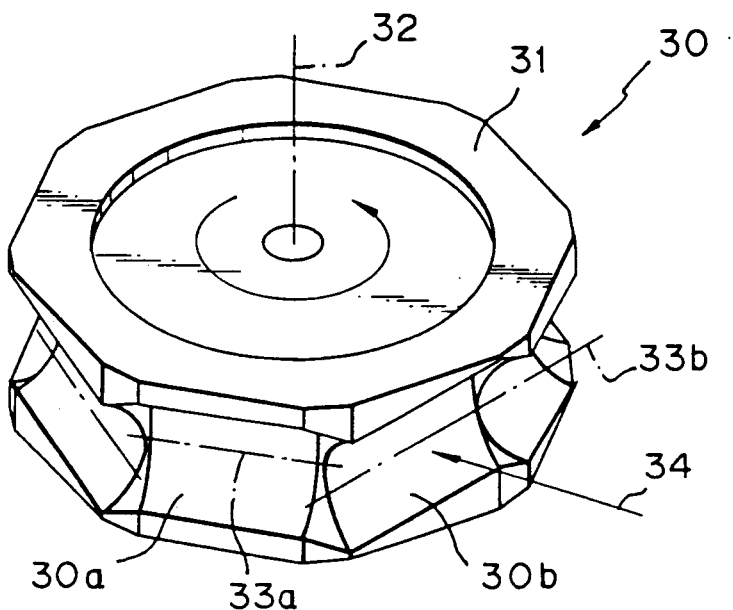
FIG. 1 is a perspective view of a polygonal rotary mirror used in a laser beam scanner according to a first embodiment of the present invention.

As shown in FIG. 1, a polygonal rotary mirror 30 according to the present invention has a plurality of reflection surfaces 30a, 30b, ..., each arranged on a respective outer side wall of a columnar mirror body 31 having a polygonal cross-section, such as an octagon. The rotary mirror 30 is driven to rotate at a predetermined speed about an axis 32 by a not shown motor.

Figure 2:
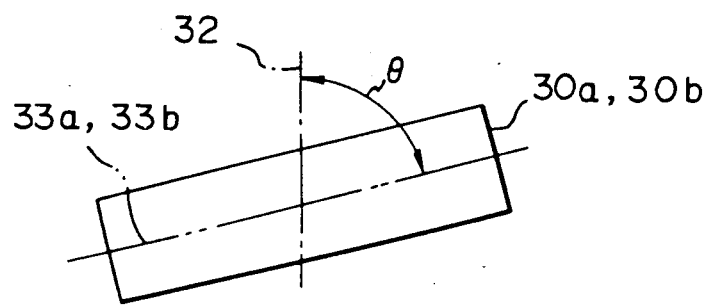
FIG. 2 is a schematic front view of a reflection surface of the rotary mirror, illustrating an inclination angle thereof.

Each reflection surface 30a, 30b forms a concavity constituted by a part of an inner side wall of a circular cylinder. In more detail, each reflection surface 30a or 30b has an elongated rectangular shape which is cut out from the circular cylinder along a height thereof and disposed laterally to intersect with the rotary axis of the rotary mirror 30. As illustrated in FIG. 2, a ridgeline 33a, 33b, i.e., a line connecting the deepest points of the surface cross-section, intersects with the rotary axis 32 of the mirror 30 at an angle $\theta$, viewed from the front, and the angle $\theta$ of one reflection surface is different from the angle $\theta$ of another reflection surface. According to this structure, the direction of a normal vector to the reflection surface is gradually varied as a point of incidence of the projected laser beam 34 on the reflection surface is moved along a scanning line.

Figure 3:
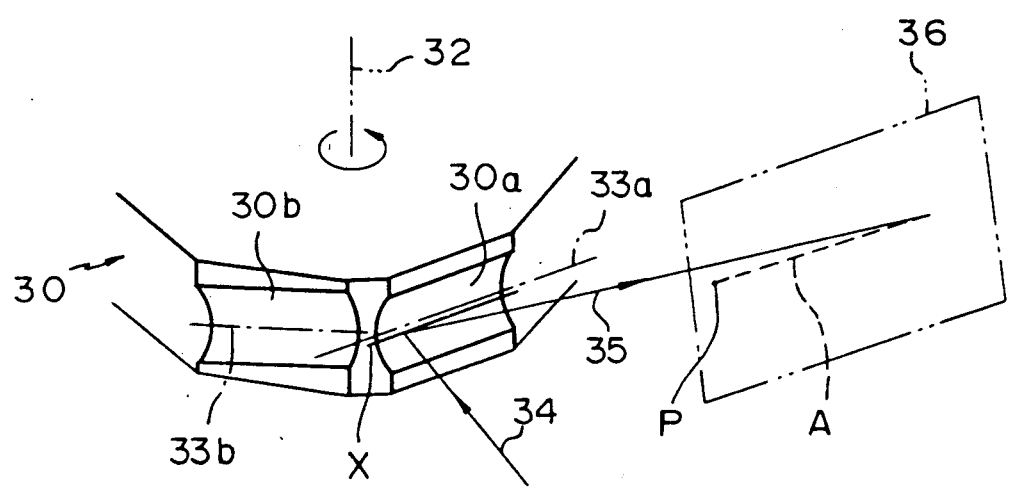
FIGS. 3 and 4(a) through 4(c) are perspective views, respectively, illustrating a principle of forming omni-directional scanning patterns.

To simplify the explanation, the laser beam 34 is assumed to be incident on the reflection surface in such a manner that it intersects the rotary axis 32. If the inclination angle $\theta$ of the reflection surface 30a relative to the rotary axis 34 is 90°, as shown in FIG. 3, a trace of the point of incidence of the laser beam 34 forms a straight line X coinciding with the ridgeline 33a or parallel thereto. Accordingly, the incident beam 34 is reflected by the reflection surfaces 30a at an identical angle. Note, a reflected beam 35 depicts a resultant scanning pattern on a screen 36, as shown by A in FIG. 3.

Figure 4A:
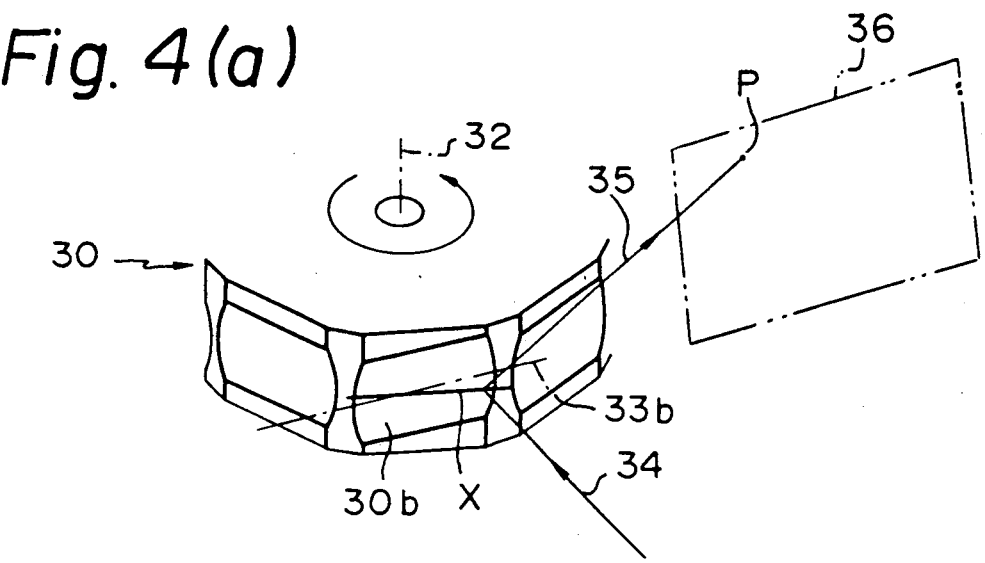
Figure 4B:
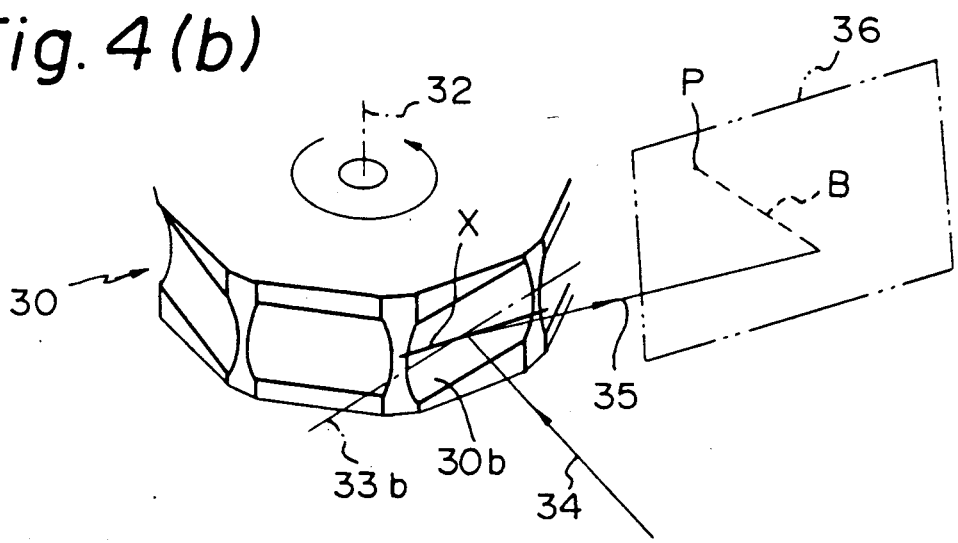
Figure 4C:
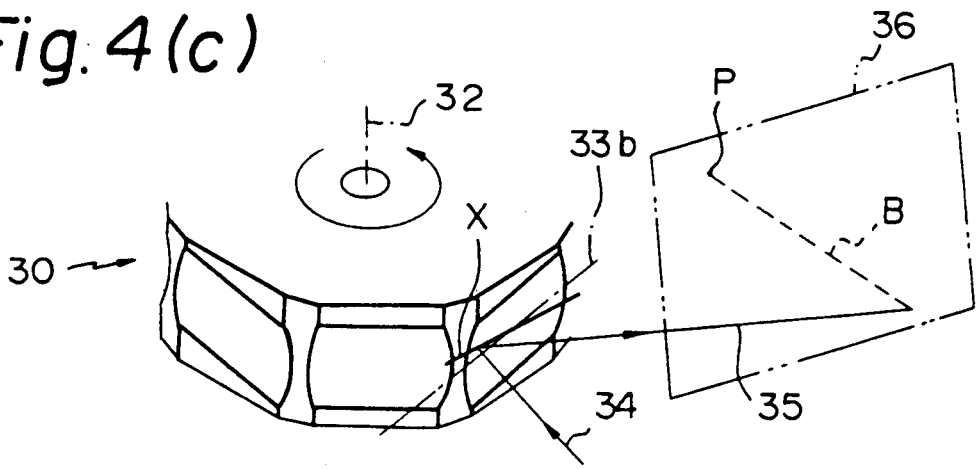

If the inclination angle θ is other than 90°, as illustrated in FIGS. 4(a) through 4(c), the point of incidence of the laser beam 34 is moved along the same scanning line X as above, as the rotary mirror 30 is rotated. This scanning line X, however, is not parallel to the ridgeline 33b of the reflection surface 30b, but inclined thereto, and accordingly, the angle of incidence of the laser beam 34 on the reflection surface 30b varies from one point to another, whereby the reflected beam 35 is gradually directed downward from starting point P to trace a scanning pattern B different from the scanning pattern A. As will be clear from the above description, various scanning patterns can be obtained by varying a magnitude and/or direction of the inclination angle θ.

Figure 5:
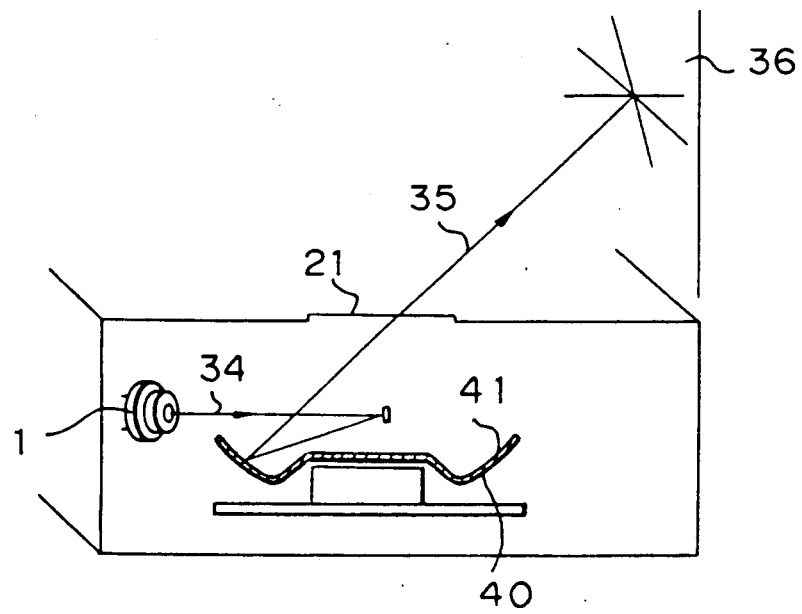
FIG. 5 is a schematic view of main parts of a laser beam scanner according to a second embodiment of the present invention.

FIG. 5 is a schematic view of a laser beam scanner according to another embodiment of the present invention, in which a plurality of concave reflection surfaces 41 are arranged on the inner wall of a cup shaped rotary mirror 40. This structure enables the size of the beam scanner to be reduced.

Figure 6:
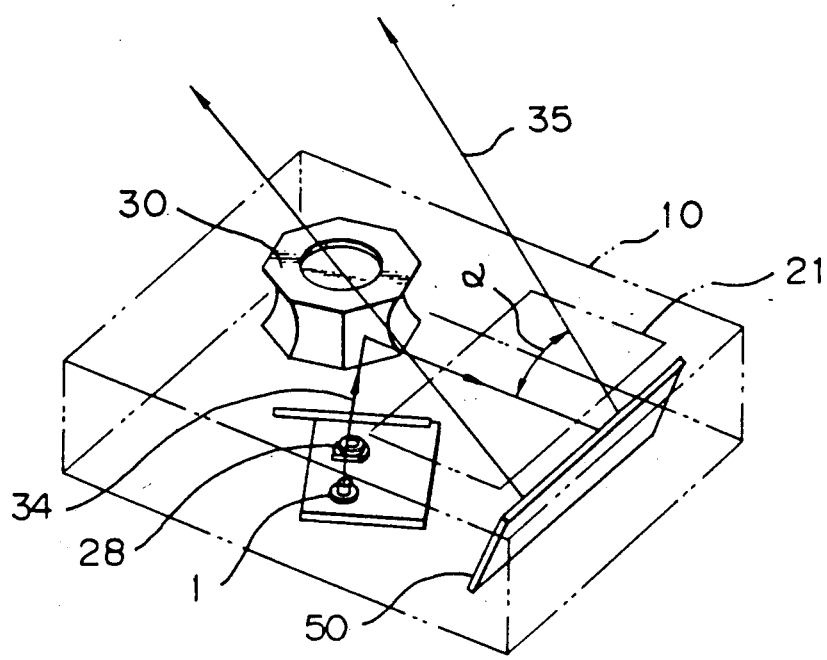
FIG. 6 is a perspective view of a laser beam scanner according to a third embodiment of the present invention, illustrating the main parts thereof.

FIG. 6 shows a third embodiment of the present invention, in which an additional flat mirror 50 is added to the structure of the first embodiment, after the rotary mirror 30, for deflecting the beam reflected by the rotary mirror 30 out of the scanner housing at a desired angle α, whereby the degree of freedom of machine design is enlarged.

The reflection surface of the rotary mirror may be convex instead of concave, as described before, and in the case of a convex reflection surface, the inclination of the scanning pattern is the reverse of that in the case of a concave reflection surface. Also, the reflection surface may be constituted by a specific curved surface other than a part of a circular cylinder.

As stated above, according to the present invention, a rotary mirror is provided with a plurality of curved reflection surfaces, each having a longitudinal axis inclined to a rotary axis of the rotary mirror, and thus it is unnecessary to provide a plurality of pairs of flat mirror to obtain omni-directional scanning patterns of the reflected beam. Accordingly, the manufacturing cost of the beam scanner can be lowered and the size of the scanner reduced.

We claim:

1. An optical beam scanner for reading a bar-code, comprising:
    a beam generator for projecting a laser beam along a fixed axis;
    a rotary mirror rotatable about its axis and having a plurality of reflection surfaces arranged in a polygonal manner on a periphery of the rotary mirror, wherein the reflection surfaces receive and reflect the laser beam, and wherein each of the reflection surfaces includes an elongated generally rectangular concave surface that is generally cylindrical about an axis so as to form a ridgeline having an inclination angle relative to the axis of the rotary mirror, the inclination angle of the ridgeline of each of the respective reflection surfaces being different;
    means for rotating the rotary mirror at a predetermined speed;
    a housing accommodating the beam generator and having a window positioned so that the laser beam is reflected from respective reflection surfaces of the rotary mirror and passes through the window.

2. An optical beam scanner for reading a bar-code as defined by claim 1, wherein the beam scanner further comprises:
    at least one additional flat mirror positioned downstream of the rotary mirror such that the laser beam reflected by the reflection surface is directed in an optional output direction.

* * * * *